United States Patent
Alzieu et al.

(10) Patent No.: US 10,312,726 B2
(45) Date of Patent: Jun. 4, 2019

(54) METHOD AND SYSTEM USING WEIGHTED GENERATION CAPACITY TO IMPROVE MANAGEMENT OF ELECTRICAL POWER GENERATION FACILITY

(71) Applicant: ELECTRICITE DE FRANCE, Paris (FR)

(72) Inventors: Jean Alzieu, Paris (FR); Guy Schweitz, Blennes (FR); Patrick Theuret, Paris (FR)

(73) Assignee: ELECTRICITE DE FRANCE, Paris (FR)

( * ) Notice: Subject to any disclaimer, the term of this patent is extended or adjusted under 35 U.S.C. 154(b) by 214 days.

(21) Appl. No.: 15/507,008

(22) PCT Filed: Sep. 4, 2015

(86) PCT No.: PCT/FR2015/052359
§ 371 (c)(1),
(2) Date: Feb. 27, 2017

(87) PCT Pub. No.: WO2016/034831
PCT Pub. Date: Mar. 10, 2016

(65) Prior Publication Data
US 2017/0310154 A1    Oct. 26, 2017

(30) Foreign Application Priority Data
Sep. 5, 2014    (FR) ..................................... 14 58361

(51) Int. Cl.
*H02J 3/28* (2006.01)
*H02J 3/38* (2006.01)
(Continued)

(52) U.S. Cl.
CPC .................. *H02J 7/35* (2013.01); *H02J 3/28* (2013.01); *H02J 3/383* (2013.01); *H02J 7/007* (2013.01);
(Continued)

(58) Field of Classification Search
CPC ...... H02J 3/28; H02J 3/383; H02J 7/35; H02J 7/007; H02J 7/0068; H02S 40/38; H02S 50/00
(Continued)

(56) References Cited

FOREIGN PATENT DOCUMENTS

WO      2013/128731 A1    9/2013
WO      WO-2013128731 A1 *  9/2013  ............... H02J 3/32

OTHER PUBLICATIONS

Machine translation of WO-2013128731-A1 (Year: 2018).*

* cited by examiner

*Primary Examiner* — David V Henze-Gongola
(74) *Attorney, Agent, or Firm* — Drinker Biddle & Reath LLP

(57) ABSTRACT

A method for managing an electrical power generation facility including an electrical power generation device, a storage device, and a control module is described. The method includes: assessing a power generation capacity of the generating device for a given period; determining a weighted generation capacity on the basis of said assessed generation capacity and at least one assessed power generation capacity of said generation device over a period preceding said given period; and determining, for a period after the given period, a discharge limit for the storage device on the basis of said weighted generation capacity. A related computer program, control module, and facility are also described.

12 Claims, 2 Drawing Sheets

(51) Int. Cl.
*H02J 7/00* (2006.01)
*H02J 7/35* (2006.01)
*H02S 40/38* (2014.01)
*H02S 50/00* (2014.01)

(52) U.S. Cl.
CPC ............ *H02J 7/0068* (2013.01); *H02S 40/38* (2014.12); *H02S 50/00* (2013.01); *H02J 2007/005* (2013.01); *H02J 2007/0067* (2013.01); *Y02E 10/563* (2013.01); *Y02E 10/566* (2013.01); *Y02E 70/30* (2013.01)

(58) Field of Classification Search
USPC ........................................................ 320/101
See application file for complete search history.

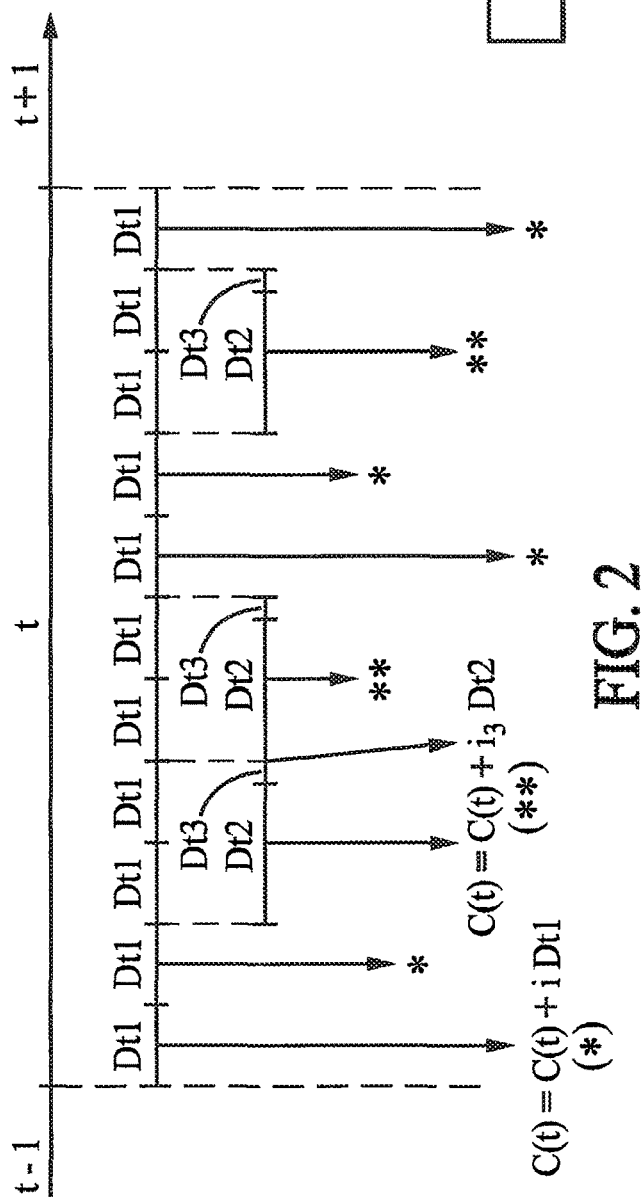
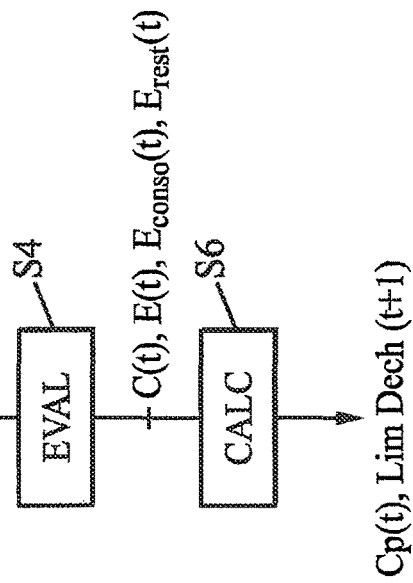
FIG. 2
FIG. 3

METHOD AND SYSTEM USING WEIGHTED GENERATION CAPACITY TO IMPROVE MANAGEMENT OF ELECTRICAL POWER GENERATION FACILITY

CROSS-REFERENCE TO RELATED APPLICATIONS

This application is the U.S. national phase of the International Patent Application No. PCT/FR2015/052359 filed Sep. 4, 2015, which claims the benefit of French Application No. 14 58361 filed Sep. 5, 2014, the entire content of which is incorporated herein by reference.

BACKGROUND

The invention relates to a method for managing an electrical energy generation facility comprising an electrical energy storage device.

In this type of facility, the storage device is used to store electrical energy generated by a generation device comprised in the facility, for example when more energy is generated than is consumed by equipment connected to the output of the facility. Conversely, the energy stored in the storage device is output to the equipment in order to supplement the generated energy when the latter is insufficient to supply to the equipment.

To avoid certain phenomena of degradation and shortened service life of the storage device, occurring due to usage conditions beyond its optimum operating envelope, it is preferable to have precise control over the charging and discharging of this device.

In this context, it is known to regulate the charging and discharging of the storage device according to the voltage it presents and which provides information concerning the amount of electrical energy it contains. This amount is then made visible by a display device showing colors which each correspond to a range of available energy, for example green for a high level of energy, orange for a moderate level, and red for a low level.

This practice presents a major problem: the discharge currents generally used do not allow transitioning between the high level and the moderate level until the discharge percentage is between 60% and 80%, which means a lack of visibility in the 15%-50% discharge range, corresponding to one day of autonomy, keeping in mind that such autonomy is generally from two days to a week. A 15% discharge thus corresponds to one day of autonomy when the storage device has an autonomy of seven days, and 50% discharge corresponds to when the storage device has an autonomy of two days.

To improve the situation, it is known to compare these voltage measurements with measurements of the discharge current. For a given charge state, the greater the discharge current the lower the measured voltage. However, these quantities, and in particular the voltage, are affected by external factors such as temperature. To account for these effects which are difficult to model, manufacturers record a series of data charts. These charts correspond to fixed situations that may substantially differ from actual situations, particularly due to transient effects. In addition, the behavior of the storage device changes with age, which these charts do not take into account.

To remedy these problems, it is known to calculate the ampere-hours entering and leaving the storage device and to relate these ampere-hours to the capacity of the storage device. However, there is uncertainty in this method due to the unpredictable nature of the variations in current efficiency during the charge and discharge reactions. This gives rise to significant deviations from the estimated charge state when the charge state remains within the blind area of the voltage measurements. An adjustment must then be made when the charge state leaves this blind area. However, the deviations that occur may be such that readjustments to the charge state of the storage device by several tens of percentage points may be necessary, which is inconsistent with a precise evaluation and control of the charging and discharging of the storage device and an operation of said device within its optimum envelope.

SUMMARY

The invention aims to improve the situation.

To this end, the invention relates to a method for managing an electrical energy generation facility comprising:
  an electrical energy generation device,
  an electrical energy storage device adapted for storing electrical energy generated by the electrical energy generation device and for outputting electrical energy to equipment connected to said facility,
  a control module configured for controlling the charging and discharging of the storage device.
In particular, the method comprises the steps of:
  evaluating an electricity generation capacity of the generation device for a given period,
  determining a weighted generation capacity on the basis of said evaluated electricity generation capacity and at least one electricity generation capacity of said generation device evaluated over a period prior to said given period,
  determining, for a period subsequent to the given period, a discharge limit of the storage device on the basis of said weighted generation capacity, and
  during the subsequent period, limiting the amount of electricity output to the connected equipment as a function of the discharge limit.

A discharge limit is thus obtained which accurately incorporates an amount of electricity that it is preferable not to exceed in order to stay within the optimal usage conditions of the storage device. This helps prevent undesirable effects such as a rapid decrease in the storage capacity provided by the storage device and thus its premature aging. The service life of the storage device is thus improved. Furthermore, this discharge limit is evaluated simply and solely by using information available within the storage device. In particular, the discharge limit is not based on any predictive considerations built from information outside the facility, which would require connecting the facility to a remote communication center. This would be particularly disadvantageous for small scale facilities, for example such as facilities coupled to a residence and not connected to a power grid, such as SHS ("Solar Home System") and EnR ("Renewable Energy") systems. In addition, it limits the discharging of the storage device, which reduces the risk of its operating outside its optimum envelope, and does so regardless of the consumption of the equipment connected to the output.

According to one aspect of the invention, during the subsequent period, the amount of electricity output to the connected equipment is limited to the value of the discharge limit determined for said subsequent period.

According to one aspect of the invention, during the subsequent period, the amount of electricity output to the connected equipment is limited to the sum of the discharge limit determined for said subsequent period and a value representative of the difference between the discharge limit during at least one period prior to said subsequent period and the amount of electricity output to the connected equipment at the end of said prior period.

According to one aspect of the invention, during said subsequent period, a display device is controlled to display an amount of electricity remaining for the subsequent period, said amount of remaining electricity being determined from the difference between said discharge limit and the amount of electricity output to the equipment connected to the facility during the subsequent period. This allows the user of the facility to adjust consumption according to the discharge limit and thereby prevent operating conditions leading to degradation of the properties of the storage device.

In one embodiment, the given period comprises at least a first period during which the control module operates in a first mode of operation in which the control module does not apply control settings adapted for regulating the electrical energy generated by the generation device and supplied to the storage device, and at least a second period during which the control module operates in a second mode of operation in which the control module applies at least one charge control setting.

In one embodiment, the electricity generation capacity for the given period is evaluated on the basis of:
- the current supplied by the generation device during at least one first period, and the duration of the at least one first period, and
- the duration of at least one second period, and, for each second period considered, the current supplied by the generation device during a third period following said second period considered and during which the control module operates in the first charging mode.

One can thus accurately measure the generation capacity of the storage device while minimally impacting the charging of the storage device and the applied charge control.

Advantageously, the duration of the third period is between $10^{-3}$ and 10 seconds. These values allow a more precise measurement of the generation capacity, as the measurements are not tainted by errors related to transient phenomena occurring when the charge control is interrupted.

According to another aspect of the invention, the weighted generation capacity for the given period is determined from the relation:

$$Cp(t)=\Sigma_{i=0}^{k}a_i(t)C(t-i)$$

where Cp is the weighted generation capacity, t is the given period, t−i is a period prior to the given period, C(t−i) is the generation capacity during period t−i, k is a nonzero number of periods including period t for which the generation capacity of the generation device is taken into account when evaluating the weighted generation capacity for the given period, and $a_i(t)$ is a weighting factor for the generation capacity C(t−i) of period t−i.

According to another aspect of the invention, the weighted capacity is evaluated from the relation:

$$Cp(t)=a(t)*C(t)+(1-a(t))*Cp(t-1),$$

where a(t) is a factor between 0 and 1.

According to one aspect of the invention, the discharge limit of the subsequent period is determined to be less or equal to the ratio Cp(t)/c(t), where t is the given period, Cp(t) is the weighted generation capacity for the given period (t), and c(t) is a charge coefficient of the storage device for the given period (t).

In one embodiment, the discharge limit is determined from the relation:

$$LimDech(t+1)=Cp(t)/(c(t)*s(t)),$$

where LimDech is the discharge limit, t+1 denotes the period subsequent to the given period, and s(t) is a safety coefficient for the given period which is greater than or equal to 1.

The invention also concerns a computer program comprising instructions for implementing the method defined above, when the program is executed by a processor.

In addition, the invention relates to a control module for an electrical energy generation facility, said electrical energy generation facility comprising:
- an electrical energy generation device,
- an electrical energy storage device adapted for storing electrical energy generated by the electrical energy generation device and for outputting electrical energy to equipment connected to said facility,
- the control module being configured for controlling the charging and discharging of the storage device,
- the control module being further configured for:
- evaluating an electricity generation capacity of the generation device for a given period,
- determining a weighted generation capacity on the basis of said evaluated generation capacity and at least one electricity generation capacity evaluated over a period prior to said given period,
- determining, for a period subsequent to the given period, a discharge limit of the storage device on the basis of said weighted generation capacity, and
- during the subsequent period, limiting the amount of electricity output to the connected equipment on the basis of the discharge limit.

Furthermore, the invention relates to an electrical energy generation facility, said electrical energy generation facility comprising:
- an electrical energy generation device,
- an electrical energy storage device adapted for storing electrical energy generated by the electrical energy generation device and for outputting electrical energy to equipment connected to said facility,
- the facility comprising a control module as defined above.

In one embodiment, the generation device comprises one or more photovoltaic panels. The invention is particularly suitable for this type of device, as the generation capacity of these devices is highly variable in comparison to other types of generation devices.

According to another aspect of the invention, the storage device comprises one or more lead-acid batteries. This is particularly advantageous as this type of battery is highly susceptible to persistent discharge states, which then cause a phenomenon of hard sulfation of the electrodes, in other words a gradual loss of reactivity of the lead sulfate produced by the discharge reaction. These prolonged discharge states are also responsible for stratification phenomena in the battery electrolyte, mainly in the case of vented batteries, in which the electrolyte has a spatially heterogeneous concentration of sulfuric acid. In particular, the concentrations are higher in the lower portions of the electrodes, which leads to selective discharge of these lower portions and premature aging of the corresponding electrode portions.

BRIEF DESCRIPTION OF THE DRAWINGS

The invention will be better understood from reading the following detailed description, provided solely as an example and with reference to the appended Figures, in which:

FIG. 2 is a schematic illustration of the periods of the electrical energy generation facility of FIG. 1; and FIG. 3 is a schematic illustration of a method for managing an electrical energy generation facility according to the invention.

DETAILED DESCRIPTION

Figure 1:
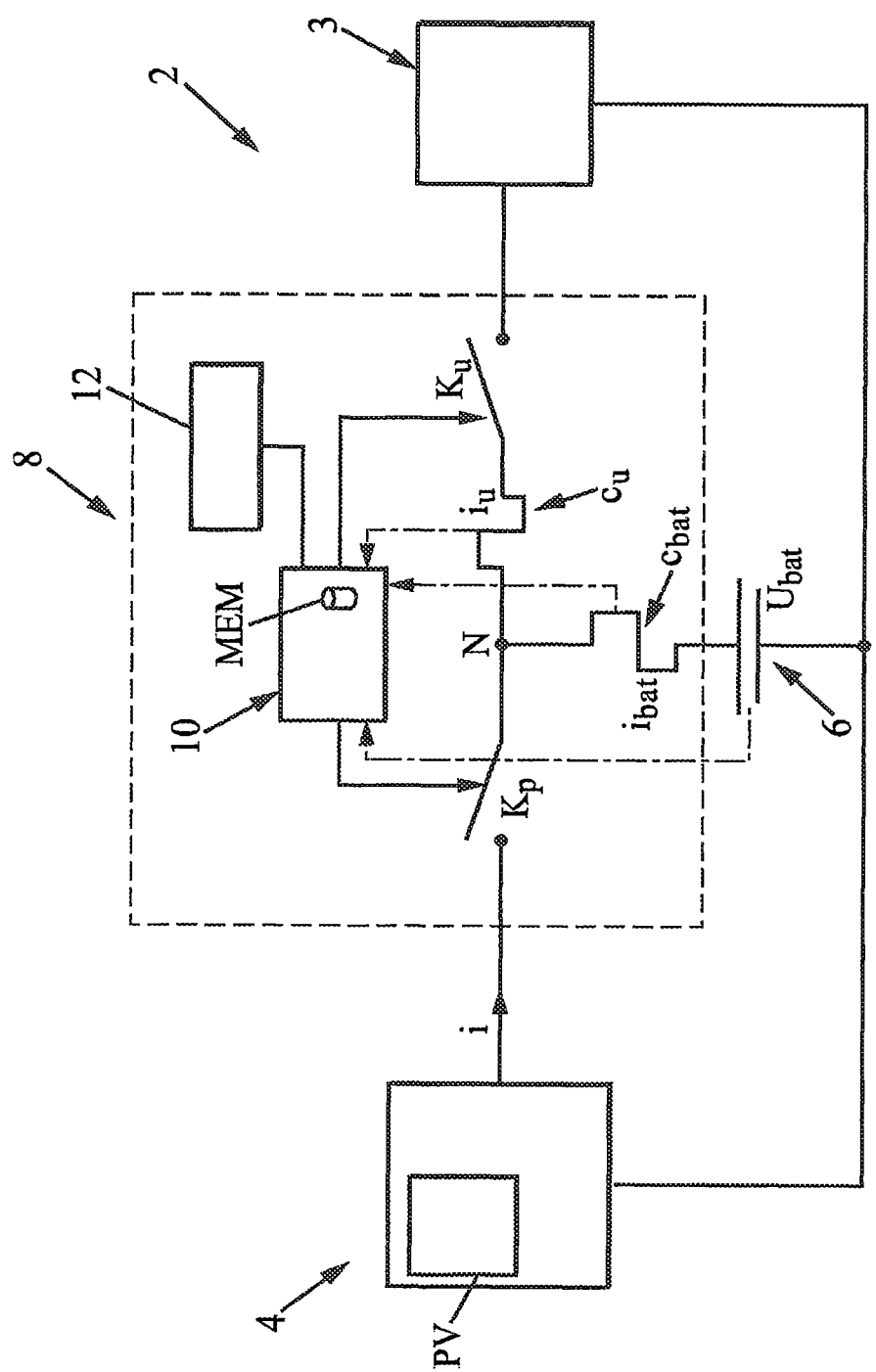
FIG. 1 is a schematic illustration of an electrical energy generation facility according to the invention.

FIG. 1 shows an electrical energy generation facility 2 according to the invention, hereinafter referred to as the facility 2, adapted to provide electrical energy to one or more items of equipment 3. Such equipment 3 corresponds, for example, to electrical systems of a residence, such as heating systems, lighting devices, household appliances, etc.

The facility 2 comprises an electrical energy generation device 4, or generation device 4, an electrical energy storage device 6, or storage device 6, and a management module 8 configured for controlling the charging and discharging of the storage device 6 as well as the supplying of energy to the equipment 3.

Preferably, the facility 2 is a facility for the generation of renewable energy, or EnR. More specifically, the facility 2 is preferably a photovoltaic facility. In the corresponding embodiments such as the one of FIG. 1, the generation device 4 comprises one or more photovoltaic panels PV. In some embodiments, the generation device 4 only comprises photovoltaic panels. In addition, in some embodiments such as the one of FIG. 1, the generation facility 2 is not connected to a power grid.

The generation device 4 is connected to the management module 8 and provides it with a current i.

The storage device 6 is adapted for storing electrical energy from the generation device 4 and for restoring this electrical energy to the equipment 3. The storage device 6 is preferably an electrochemical storage device. In the corresponding embodiments, the storage device 6 preferably comprises at least one lead-acid battery. Preferably, the lead battery is a sealed battery, as opposed to a so-called "vented" battery.

The storage device 6 has a storage voltage $U_{bat}$ and provides a current $i_{bat}$.

The management module 8 comprises a control module 10 according to the invention and a display device 12. The control module 8 further comprises three branches connected to a node N, each branch respectively connecting the generation device 4, the storage device 6, and the equipment 3 to the management module 8. The branch connecting the management module 8 to the generation device 4 and the branch connecting the management module 8 to the equipment 3 are each provided with a respective switch Kp, Ku. The switches are adapted for selectively connecting or disconnecting the storage device 6 respectively with the generation device 4 or with the equipment 3, in particular in order to regulate the electrical energy provided to the storage device 6 by the generation device 4 and the electrical energy provided to the equipment 3. The switches Kp and Ku are, for example, insulated-gate field effect transistors known as MOSFET ("Metal Oxide Semiconductor Field-Effect Transistor").

The control module 10 is configured for controlling the charging and discharging of the storage device 6 as well as supplying energy to the equipment 3 from the electrical energy provided by the generation device 4 and from the electrical energy stored in the storage device 6. To do this, the control module 10 is connected to the switches Kp and Ku and is configured to control their opening or closing in order to connect the elements of the facility 2, in particular for controlling the charging and discharging of the storage device 6. As illustrated in FIG. 1 and as described in more detail below, this control is carried out in particular as a function of the current i supplied by the generation device 4, the voltage $U_{bat}$ and current $i_{bat}$ provided by the storage device 6, and the current $i_u$ provided to the equipment 3. The currents $i_{bat}$ and $i_u$ are measured by sensors $c_{bat}$ and $c_u$ arranged on the corresponding branch. These sensors are shunts for example.

In particular, the control module 10 is configured for applying at least one control setting adapted for regulating the electrical energy supplied to the storage device 6 when the terminal voltage of the storage device 6 exceeds a predetermined threshold value. In practice, this charge control setting aims to control the voltage across the terminals of the storage device 6. For example, when the storage device 6 comprises sealed lead-acid batteries, this control aims to limit the voltage across the terminals of the battery. In the case of vented lead-acid batteries, this control may also serve to stir the electrolyte comprised therein. The control setting is implemented by controlling the opening and closing of the switch Kp, for example by applying a method of regulation by pulse-width modulation (PWM). As is known, this mechanism for controlling the end of charge aims to prevent excessive overload of the storage device 6, which would also cause a phenomenon of premature aging of the storage device 6, for example due to corrosion mechanisms and/or growth of electrodes, or due to electrode dryout. The control module 10 thus has a first mode of operation in which it does not apply control settings, and a second mode of operation in which it applies at least one control setting.

In the context of the invention, the control module 10 is further configured for:

- evaluating an electricity generation capacity C(t) of the generation device 4 for a given period t,
- determining a weighted generation capacity Cp(t) on the basis of said evaluated generation capacity C(t) and at least one electricity generation capacity C(t) of said generation device evaluated over a period t−i prior to said given period, and
- determining, for a period t+1 subsequent to the given period t, a discharge limit LimDech(t+1) of the storage device 4, on the basis of said weighted generation capacity Cp(t).

In the context of the invention, the discharge limit is representative of an electricity credit allocated to the connected equipment, determined on the basis of the weighted generation capacity. It therefore constitutes a possible discharge limit, considering the situation of the generation device 4.

In principle it does not correspond to a limit which, if exceeded, inevitably leads to degradation of the storage device. The generation device 4 is not the only factor that can influence the amount of electricity available to supply to the connected equipment, and the history of the system itself may intervene here.

As we shall see below, under certain conditions it may thus be possible to increase said credit by an amount representative of the fact that the allocated credit was not fully used during a prior period, meaning that the discharge limit was not reached during that prior period.

In parallel, for each period t, the control module 10 is also configured for evaluating:

the amount of electricity E(t) generated by the device 4 during the period t under consideration, and the amount of electricity $E_{conso}(t)$ consumed by the equipment 3 during period t.

In the context of the invention, the generation capacity, the weighted generation capacity, the discharge limit, and the quantities E(t) and $E_{conso}(t)$ are evaluated in amp-hour (Ah).

Each period preferably substantially corresponds to one day. The start time of each new period t is determined based on a predetermined parameter. For example, the control module 10 is configured to initialize a new period t in response to the detection of the value of the current i supplied by the generation device 4 at a value less than a value $i_0$ selected as representative of the occurrence of nightfall. The exact moment of a new period may therefore vary slightly over time, with no impact on the principle of the invention.

Referring to FIG. 2, each period t comprises one or more first periods Dt1. For example, the first periods Dt1 succeed one another without interruption for the entire duration of a period t.

In addition, each period t comprises one or more second periods Dt2 during which the control module 10 operates according to the second mode of operation. Each second period Dt2 is followed by a third period Dt3, at the beginning of which the control module switches from the second mode of operation to the first mode of operation. A second period Dt2 and the associated third period Dt3 are consecutive. Every third period Dt3 is constructed as an adjustment of a second period Dt2 so as to permit measurement of the current i that would be provided by the generation device 4 if the charge control applied during this second period Dt2 were not implemented. In practice, each third period Dt3 can be viewed as the final phase of the associated second period Dt2 and during which the charge control is interrupted.

As illustrated in FIG. 2, the control module 10 performs parallel monitoring of the first periods Dt1 on the one hand and of the second and third periods Dt2, Dt3 on the other, so that a first and a second period Dt1, Dt2 may run in parallel. Thus, for example, period t comprises at least a first period Dt1 during which the control module 10 operates in the first mode of operation, and at least a first period Dt1 during which the control module operates in the second mode of operation.

The duration of a first period Dt1 is between 1 and 10 seconds for example. The duration of a second period is between 30 seconds and 5 minutes. The duration of a third period Dt3 is between $10^{-3}$ and 10 seconds, and is for example 3 seconds. Note that the length of a third period Dt3 is small or even insignificant compared to the duration of a second period Dt2. In the following, Dt1 (i=1, 2, or 3) denotes both a period and the duration of that period.

Preferably, the beginning of a second period Dt2 corresponds to the beginning of a first period Dt1.

This modeling of each period t in first, second, and third periods Dt1, Dt2, Dt3 allows precise monitoring of several indicators related to the facility 2, as will be seen below.

At the beginning of each period t, the control module 10 initializes to zero the capacity C(t), the amount E(t), and the amount $E_{conso}(t)$.

During each period t, the control module 10 is configured for:

incrementing the amount of electricity E(t) by the amount i*Dt1 at the end of every first period Dt1; and incrementing the amount of electricity $E_{conso}$ by the amount $i_u$*Dt1 at the end of every first period Dt1.

The amounts E(t) and $E_{conso}$ are incremented from the beginning of period t until the end of period t. The evaluation of amounts E(t) and $E_{conso}$ is thus independent of the mode of operation of the control module 10.

In addition, the control module 10 is configured for:

at the end of each period Dt1 in which the control module 10 is operating in the first mode of operation, incrementing the capacity C(t) by i*Dt1, and at the end of each period Dt3 following a second period Dt2 in which the control module 10 is operating in the second mode of operation, incrementing the capacity C(t) by the product of the duration Dt2 and the current i measured at the end of the third period Dt3 which follows the period concerned Dt2. This current will be denoted $i_3$ in the following.

This principle of incrementation is observed from the beginning of period t until the end of period t, after which the values of C(t), $E_{conso}(t)$, and E(t) are saved, for example in a memory MEM of the control module 10.

The control module 10 is configured to evaluate the weighted capacity Cp(t) of the considered period t based on the capacity C(t) thus determined for period t, as well as on a capacity C(t−i) evaluated for a period prior to period t.

Specifically, the weighted capacity is evaluated using the general relation:

$$Cp(t)=\Sigma_{i=0}^{k} a_i(t) C(t-i), \quad (A)$$

where $a_i(t)$ is a non-zero weighting factor for the capacity C(t) measured for period t−i, and k corresponds to the non-zero number of periods (including period t) for which the generation capacity of the generation device 4 is taken into account for the evaluation of the weighted generation capacity of period t. This improves the precision of the evaluation of the weighted generation capacity.

Each weighting factor $a_i(t)$ has a value determined on the basis of criteria which for example include the distance from the period considered to period t and/or the difference between the capacity C(t) obtained and an expected value for this capacity. Alternatively, the respective values of the factors $a_i(t)$ are predetermined and are constant from one period to another.

In some embodiments, we further have the relation $\Sigma_{i=0}^{k} a_i(t)=1$.

K is preferably less than 10, and more preferably less than 5. This reduces the computational power required to obtain the weighted capacity Cp(t).

In, one particular embodiment, the weighted capacity is evaluated recursively using the following relation:

$$Cp(t)=a(t)*C(t)+(1-a(t))*Cp(t-1), \quad (B)$$

where a(t) is a factor between 0 and 1. The value of a(t) is predetermined based on the period considered, for example based on the number of periods taken into consideration. In some embodiments, a is constant from one period to another, and for example is equal to 0.3.

Relation B allows determining the weighted capacity in a manner that is both accurate and simple. Each new value of the weighted capacity Cp takes into account all previous values, and for its determination only requires the value it had in the previous period. The amount of memory required for evaluating the weighted capacity is therefore small and constant over time, while the number of periods taken into account by the weighted capacity increases.

Note that relation B is a specific case of relation A.

The control module 10 is further configured for evaluating the discharge limit LimDech(t+1) of period t+1 as a parameter less than or equal to the ratio Cp(t)/c(t), where Cp(t) is the weighted capacity of period t and c(t) is a charge coefficient of the storage device.

Advantageously, the control module is configured for evaluating the discharge limit of the next period from the relation:

$$\text{LimDech}(t+1) = Cp(t)/(c(t)*s(t)), \quad (C)$$

where s(t) is a safety coefficient greater than or equal to 1.

In a known manner, the charge coefficient c(t) is defined as the ratio of the amount of electrical energy to provide to a battery to charge it when it has supplied a given amount of electrical energy, and this given amount of supplied electrical energy. For example, for a sealed battery in good condition, a full charge is obtained only for a charge coefficient c of about 1.05. In the context of the invention, c is for example constant and equal to 1.05. Alternatively, the charge coefficient c is determined based on criteria such as amount E(t) and/or the age of the storage device 6.

The safety coefficient s allows introducing a safety margin. Coefficient s is for example constant and equal to 1.08.

The control module 10 is also configured to limit the amount of electricity $E_{conso}$ supplied to the equipment 3 during a period based on the discharge limit LimDech determined for that period.

Advantageously, the control module is configured to limit the amount of electricity $E_{conso}$ supplied to the equipment 3 to exactly the value LimDech.

Denoting as $E_{rest}(t)$ the amount of electricity defined by the relation:

$$E_{rest}(t) = \text{LimDech}(t) - E_{conso}(t),$$

the control module 10 is thus advantageously configured to limit the amount $E_{rest}$ during the corresponding period, to a value equal to 0.

For example, the control module 10 is thus configured to stop the supply of electricity when the amount $E_{rest}$ reaches a value of 0. For example, this value is determined as being reached when the ratio $100E_{rest}(t)/\text{LimDech}(t)$ reaches 0%.

"Limited to" is understood to mean that the proposed limit, here LimDech, constitutes the maximum value not to be exceeded. However, the amount of electricity supplied to the equipment may of course be any value between 0 and this limit, as the actual value depends on the energy requirements of the equipment during the corresponding period.

The control module 10 is further configured for regularly determining the amount of electricity $E_{rest}$ remaining for the current period before the corresponding discharge limit LimDech is reached or exceeded, and for controlling its display on the display device 12.

This amount $E_{rest}(t)$ is displayed directly in this form, or displayed indirectly for example in the form:

$100E_{rest}(t)/\text{LimDech}(t)$, in which case the expressed amount is a percentage, $V_{charac}*E_{rest}(t)$, where $V_{charac}$ is a voltage expressed in volts which is characteristic of the discharge voltage of the storage device 6 (for example 12 V), in which case the displayed value is an amount of electrical energy in Wh.

Note that the transposition of the amount of electricity $E_{rest}(t)$ into electrical energy (in the form $V_{charac}*E_{rest}(t)$) is immediate because there is little variation in the discharge voltage of the storage device within the range of currents applied and the Faraday efficiency (current efficiency) is close to one, meaning 100%. However, this is not the case when charging, where the voltage differences can exceed 20% and the Faraday efficiency, which is close to 98% during most of the charging, drops at the end of charging and tends toward zero for a fully charged battery. Also, the transposition of the electricity generation capacity C(t) into electrical energy is less easily achievable.

A method for managing the facility 2 of the invention will now be described with reference to FIG. 3.

Initially, in a step S2 starting with a new period t, the memory MEM of the command module 10 contains one or more generation capacities Cp associated with the prior periods (in particular according to whether relation A or B is used), as well as the discharge limit LimDech calculated at the end of period t−1 for period t. In addition, the amounts C(t), E(t), and $E_{conso}(t)$ are initialized to zero.

In an evaluation step S4 ending at the end of period t, the control module 10 iteratively increments the generation capacity C(t), as well as the quantities $E_{conso}(t)$ and E(t) as described above.

In a step S6 taking place at the end of period t, the control module 10 determines the weighted generation capacity Cp(t) for period t as described above with reference to relation A or B, then determines the discharge limit LimDech(t+1) for upcoming period t+1 based on the weighted capacity Cp(t), as described with reference to relation C.

In parallel to these steps, the control module 10 regulates the amount of electricity $E_{conso}(t)$ supplied to the equipment 3 according to the discharge limit LimDech(t). For example, it limits this amount to the discharge limit LimDech(t). Furthermore, the control module 10 regularly determines amount $E_{rest}(t)$ and controls its display on the display device 12, as described above.

The principle of managing the facility of the invention limits the discharge of the storage device based on the evaluation of a generation capacity of the generation device 4 that is consolidated to account for the evolution of this capacity over time. This avoids basing the discharge limit of the storage device on generation capacities that may be observed but that might not be representative of the amount of electrical energy reliably producible by the generation device 4, for example in the case of strong sunshine atypical of the current season when the generation device 4 comprises photovoltaic equipment. The invention thus allows limiting the periods of operation of the storage device 6 outside of its optimum operating envelope, particularly in lasting discharge conditions that would induce premature aging of the storage device 6.

In addition, the determination of this discharge limit is both simple and reliable, and in particular can be carried out in a simple manner even when the control module 10 is in the second mode of operation in which it regulates the charging of the storage device 6.

The invention also provides a computer program comprising instructions for implementing the method described above, when the program is executed by a processor.

Other embodiments are possible. In particular, it is possible to reinitialize the evaluated amounts for each period at a time other than the beginning of the new period t. For example, the reinitialization time is selected to be several hours later than the beginning of a new period, but still prior to sunrise.

Additionally, in some embodiments, the control module 10 is configured to limit, during period t, the amount of electricity $E_{conso}$ to the sum of the discharge limit LimDech (t) and a value denoted B(t) that is representative of the difference between the discharge limit LimDech(t−i) during at least one prior period t−i and the amount of electricity $E_{conso}$(t−i) supplied to the equipment at the end of this prior period t−i.

In other words, the value B(t) is representative of the fact that the amount $E_{rest}$(t−i)=LimDech(t−i)−Econso(t−i) was, at the end of period tii, strictly positive.

This implementation helps to refine the regulation of the storage device to account for non-consumption, by the connected equipment, of all electricity available to the equipment during the period in question t−i, and thus the existence of surplus electricity for the marginal case of consumption by the equipment of all available electricity.

The value B(t) is, for example, determined from the general relation:

$$B(t) = \sum_{i=1}^{k} b_i(t) E_{rest,fin}(t-i)$$

where $E_{rest,fin}$(t−i) is the value of the amount $E_{rest}$ at the end of period t−i, $b_i$(t) is a weighting factor for the amount $E_{rest,fin}$(t−i), and k is the horizon corresponding to the number of periods for which the value of the amount $E_{rest,fin}$(t−i) is taken into account for the evaluation of the value B(t).

The horizon k is advantageously chosen so as to limit the complexity of processing the data required. For example, it is less than or equal to 3.

In addition, the value of each weighting factor $b_i$(t) is determined for example on the basis of criteria including for example the distance of the period considered from period t.

Advantageously, the weighting factors $b_i$(t) are chosen to be decreasing as a function of i and such that the cumulative contribution of a non-zero value $E_{rest,fin}$ during a given period at value B(t) for horizon k (considered as starting with the next period) corresponds to a predetermined percentage denoted p of that value $E_{rest,fin}$.

In other words, when horizon k=3, if during period t the value $E_{rest,fin}$(t) is non-zero, this event is reflected by the relation:

$$[B(t+1)+B(t+2)+B(t+3)]-[B'(t+1)+B'(t+2)+B(t+3)]= p*E_{rest,fin}(t),$$

where B'(t+1) denotes the value B(t+1) that would be obtained if $E_{rest,fin}$(t) were zero. The percentage p is, for example, strictly less than 100%. For example, it is equal to 50%.

This embodiment is compatible with the embodiment described above. Indeed, if at the end of a given period the amount $E_{rest,fin}$ is zero, the discharge limit for the subsequent period then corresponds to that determined in the context of the embodiment described above.

Also, for a given period, the discharge limit may correspond to the discharge limit determined via the first embodiment, in other words with B being zero, and for the following period, to the limit determined according to the above embodiment.

In other words, the first embodiment corresponds to a particular case of the second embodiment in which the amount B is zero.

The invention claimed is:

1. A method for managing an electrical energy generation facility comprising:
an electrical energy generation device,
an electrical energy storage device adapted for storing electrical energy generated by the electrical energy generation device and for outputting electrical energy to equipment connected to said facility,
a control module configured for controlling the charging and discharging of the storage device,
the method comprising the steps of:
evaluating an electricity generation capacity of the generation device for a given period,
determining a weighted generation capacity on the basis of said evaluated electricity generation capacity and at least one electricity generation capacity of said generating device evaluated over a period prior to said given period,
determining, for a period subsequent to the given period, a discharge limit of the storage device on the basis of said weighted generation capacity, and
during the subsequent period, limiting an amount of electricity output to the connected equipment on the basis of the discharge limit,
wherein the given period comprises at least a first period during which the control module operates in a first mode of operation in which the control module does not apply control settings adapted for regulating the electrical energy generated by the generation device and supplied to the storage device, and at least a second period during which the control module operates in a second mode of operation in which the control module applies at least one charge control setting, and
wherein the electricity generation capacity for the given period is evaluated on the basis of:
the current supplied by the generation device during at least one first period, and the duration of the at least one first period, and
the duration of at least one second period, and, for each second period considered, the current supplied by the generation device during a third period following said second period considered and during which the control module operates in the first mode of operation.

2. The method according to claim 1, wherein, during the subsequent period, the amount of electricity output to the connected equipment is limited to the value of the discharge limit determined for said subsequent period.

3. The method according to claim 1, wherein, during the subsequent period, the amount of electricity output to the connected equipment is limited to the sum of the discharge limit determined for said subsequent period and a value representative of the difference between the discharge limit during at least one period prior to said subsequent period and the amount of electricity output to the connected equipment at the end of said prior period.

4. The method according to claim 1, wherein, during said subsequent period, a display device is controlled to display an amount of electricity remaining for the subsequent period, said amount of remaining electricity being determined from the difference between said discharge limit and the amount of electricity output to the equipment connected to the facility during the subsequent period.

5. The method according to claim 1, wherein the duration of a third period is between $10^{-3}$ and 10 seconds.

6. The method according to claim 1, wherein the weighted generation capacity for the given period is determined from the relation:

$$Cp(t)=\Sigma_{i=0}^{k} a_i(t)C(t-i)$$

where Cp is the weighted generation capacity, t is the given period, t−i is a period prior to the given period, C(t−i) is the generation capacity during period t−i, k is a nonzero number of periods including period t for which the generation capacity of the generation device is taken into account when evaluating the weighted generation capacity for the given period, and $a_i(t)$ denotes a non-zero weighting factor for the generation capacity C(t−i) of period t−i.

7. The method according to claim 6, wherein the weighted capacity is evaluated from the relation:

$$Cp(t)=a(t)*C(t)+(1-a(t))*Cp(t-1),$$

where a(t) is a factor between 0 and 1.

8. The method according to claim 1, wherein the discharge limit of the subsequent period is determined to be less or equal to the ratio Cp(t)/c(t), where t is the given period, Cp(t) is the weighted generation capacity for the given period, and c(t) is a charge coefficient of the storage device for the given period.

9. The method according to claim 8, wherein the discharge limit is determined from the relation:

$$\text{LimDech}(t+1)=Cp(t)/(c(t)*s(t)),$$

where LimDech is the discharge limit, t+1 denotes the period subsequent to the given period, and s(t) is a safety coefficient for the given period which is greater than or equal to 1.

10. A non-transitory computer program product comprising instructions for implementing the method according to claim 1, when the program is executed by a processor.

11. A method for managing an electrical energy generation facility comprising:
an electrical energy generation device,
an electrical energy storage device adapted for storing electrical energy generated by the electrical energy generation device and for outputting electrical energy to equipment connected to said facility,
a control module configured for controlling the charging and discharging of the storage device,
the method comprising the steps of:
evaluating an electricity generation capacity of the generation device for a given period,
determining a weighted generation capacity on the basis of said evaluated electricity generation capacity and at least one electricity generation capacity of said generating device evaluated over a period prior to said given period,
determining, for a period subsequent to the given period, a discharge limit of the storage device on the basis of said weighted generation capacity, and
during the subsequent period, limiting an amount of electricity output to the connected equipment on the basis of the discharge limit,
wherein the weighted generation capacity for the given period is determined from the relation:

$$Cp(t)=\Sigma_{i=0}^{k}a_i(t)C(t-i)$$

where Cp is the weighted generation capacity, t is the given period, t−i is a period prior to the given period, C(t−i) is the generation capacity during period t−i, k is a nonzero number of periods including period t for which the generation capacity of the generation device is taken into account when evaluating the weighted generation capacity for the given period, and $a_i(t)$ denotes a non-zero weighting factor for the generation capacity C(t−i) of period t−i, and
wherein the weighted capacity is evaluated from the relation:

$$Cp(t)=a(t)*C(t)+(1-a(t))*Cp(t-1),$$

where a(t) is a factor between 0 and 1.

12. A method for managing an electrical energy generation facility comprising:
an electrical energy generation device,
an electrical energy storage device adapted for storing electrical energy generated by the electrical energy generation device and for outputting electrical energy to equipment connected to said facility,
a control module configured for controlling the charging and discharging of the storage device,
the method comprising the steps of:
evaluating an electricity generation capacity of the generation device for a given period,
determining a weighted generation capacity on the basis of said evaluated electricity generation capacity and at least one electricity generation capacity of said generating device evaluated over a period prior to said given period,
determining, for a period subsequent to the given period, a discharge limit of the storage device on the basis of said weighted generation capacity, and
during the subsequent period, limiting an amount of electricity output to the connected equipment on the basis of the discharge limit,
wherein the discharge limit of the subsequent period is determined to be less or equal to the ratio Cp(t)/c(t), where t is the given period, Cp(t) is the weighted generation capacity for the given period, and c(t) is a charge coefficient of the storage device for the given period.

* * * * *